Dec. 12, 1944.         F. F. OLSON         2,365,103
METHOD OF MAKING BOOTS AND SIMILAR ARTICLES OF FOOTWEAR
Filed Sept. 22, 1942
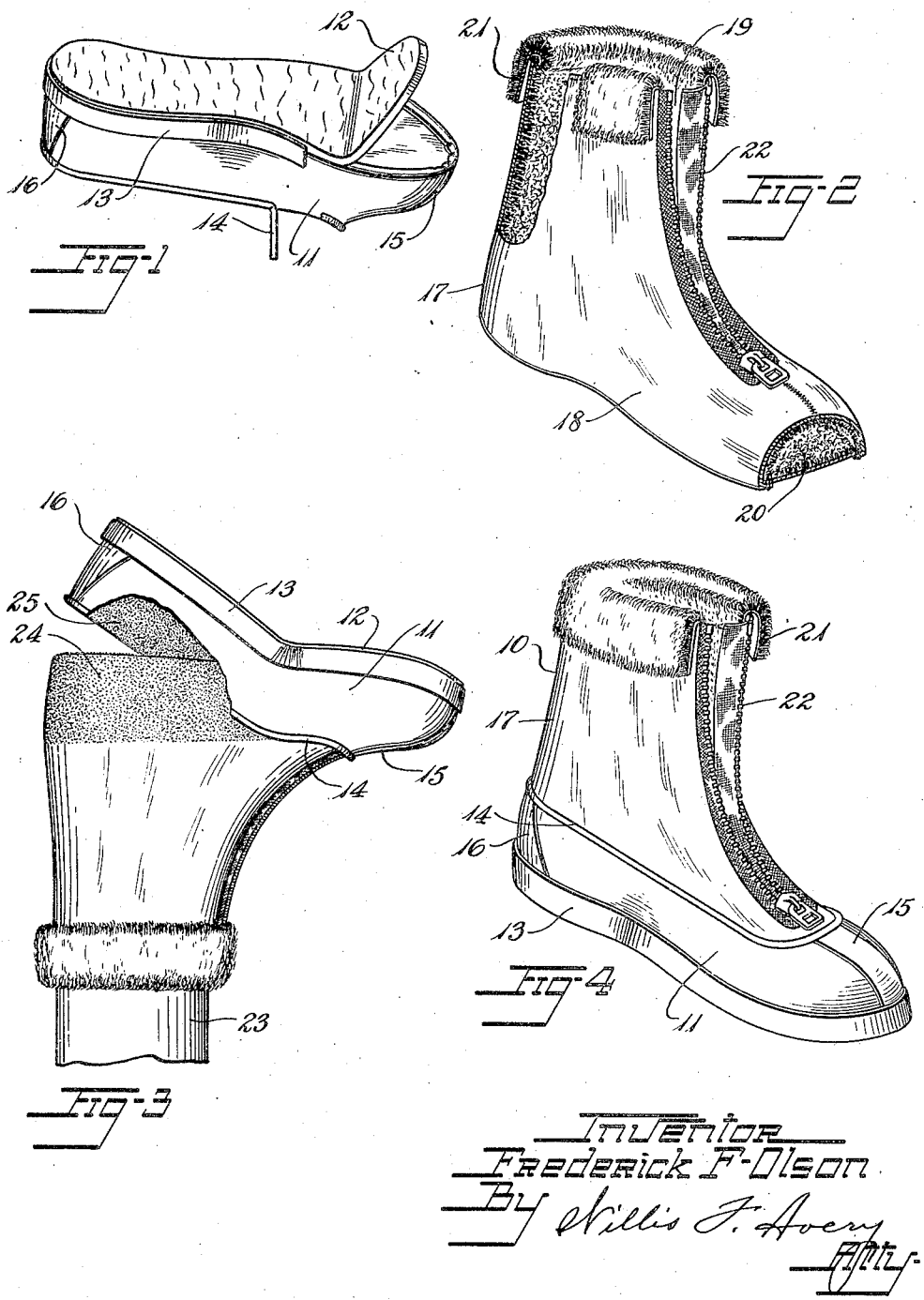

Patented Dec. 12, 1944

2,365,103

UNITED STATES PATENT OFFICE 2,365,103

METHOD OF MAKING BOOTS AND SIMILAR ARTICLES OF FOOTWEAR

Frederick F. Olson, Sudbury, Mass., assignor to The B. F. Goodrich Company, New York, N. Y., a corporation of New York Application September 22, 1942, Serial No. 459,230

5 Claims. (Cl. 12—142)

This invention relates to a method of making boots and similar articles of footwear, particularly those comprising rubber in combination with materials sensitive to heat such as leather, fleece, certain fabrics, thermoplastic synthetics, and the like, and has for its principal object the provision of a method of making boots and the like which avoids the necessity of heating and consequently possibly damaging the heat-sensitive materials as an incident to vulcanization of the rubber.

In making boots and similar articles of footwear comprising rubber and other materials, the usual practice heretofore has been to cut the component parts of the boot according to pattern, assemble these parts on a last either by stitching them together or adhering with a cement, and then to vulcanize the rubber portions by heating the entire boot assembly in a vulcanizer. The method is satisfactory with boots that have no parts consisting of heat-sensitive materials, but it has been found that boots comprising rubber and such heat-sensitive materials as leather, fleece, thermoplastics, certain fabrics, and the like, are very difficult to make in this manner. Efforts to overcome this disadvantage in the past have been along the line of compounding the rubber portion of the boot with such compounding materials that the rubber is vulcanizable at relatively low temperatures. Then by careful control of temperature the rubber in the boot is vulcanized. This practice has reduced but has not eliminated the trouble. In actual manufacturing practice there is still a very high percentage of rejects on the boots due to injury to the heat-sensitive materials. This is caused by accidental overheating which is difficult to prevent in production operations.

I have devised a method of making boots and the like comprising heat-sensitive materials wherein there is no danger of injury to these materials. I do this by assembling the heat-sensitive portions of the boot, or other footwear, in the shape they are to assume in the finished boot, separately assembling the rubber portions in the shape they are to assume in the finished boot, vulcanizing the rubber, and assembling the component parts with the various portions of the boot adhered together by means of a suitable cement such as a rubber cement vulcanizable at room temperatures.

My invention is particularly applicable to making fleece-lined rubber boots of fleecy leather and rubber. The fleecy leather of these boots is quite susceptible to the heat and moisture present in ordinary vulcanizing operations and in spite of costly precautions many of the boots are ruined in ordinary manufacturing operations. This is quite costly and wastes valuable materials.

This invention can best be understood by reference to the accompanying drawing which illustrates the steps in a preferred method of making a fleece-lined boot by the invention presented herein. In the drawing Fig. 1 is a perspective view illustrating a step in making a shell assembly comprising a rubber sole and a rubber counter reinforcement;

Fig. 2 is a perspective view of the boot's fleece-lined leather upper with portions cut away for clarity of illustration;

Fig. 3 is a side view showing the boot being assembled on a boot last and with portions cut away for clarity of illustration;

Fig. 4 is a perspective view of a completed boot made according to the method of this invention.

In manufacturing a fleece-lined leather and rubber boot 10 according to the method of this invention there is provided an unvulcanized rubber counter reinforcement 11 which is assembled on a last in the shape it is to assume in the finished boot. To this counter reinforcement is applied the sole 12, a sole reinforcing strip 13, an edging strip 14, a toe reinforcing strip 15 (Fig. 4), and a heel reinforcing strip 16, all of unvulcanized but vulcanizable rubber or analogous material. This assembly is known as a rubber shell. The unvulcanized shell is vulcanized as by heatig in a steam vulcanizer or other conventional vulcanizing equipment while maintaining it on a last in the shape it will assume in the completed shoe.

Next the fleecy leather upper 17 of the boot is cut to pattern and assembled in the shape it is to assume in the finished boot. This leather upper is made with the fleece turned inwardly to provide warmth for the wearer of the boot. The upper consists of one piece of leather 18 with a vent opening 19 in front of the boot for donning and doffing. There is also provided a fleecy leather inner sole 20 and a top marginal strip 21 folded outwardly for decorative purposes and to provide a snug fit of the boot around the leg of the wearer. The vent opening is provided with a slide fastener 22 attached to the edges of the vent 19 in the customary fashion.

In making the boot the leather upper 17 is placed over a foot-shaped last 23 as shown in Fig. 3. The edge-zone of the upper that will contact the rubber shell assembly is coated with a suitable adhesive for adhering rubber to leather as indicated by the stippled zone 24. This adhesive preferably consists of a latex cement vulcanizable at room temperature such as a cement having the following composition:

| | Parts by weight |
|---|---|
| Rubber (60% latex) | 100 |
| Sym. dibetanaphthyl-p-phenylene-diamine | 1 |
| Zinc oxide | 3 |
| Sulfur | 1 |
| Zinc dibutyl-dithiocarbamate | 1 |
| | 106 |

The inside of the shell assembly is also coated with a layer of the same type of cement as indicated by the stippling 25. The cement is permitted to dry for a few minutes and the rubber shell assembly is slipped over the foot of the boot upper in the manner illustrated in Fig. 3 and the two parts are pressed firmly into intimate contact. The finished boot is then removed from the last and stored for a period of time at ordinary room temperature to permit the adhesive to set firmly and, in the case of a vulcanizable rubber cement, to effect vulcanization of the rubber. In the case of the specific latex cement described, a storage period of twelve to fifteen days will usually be adequate. At the end of such period, all the parts are thoroughly adhered together and the boot is ready for wear.

As is readily apparent, this invention may be employed in making any articles of footwear having portions of rubber and portions of materials subject to injury by heat. It may also be used in making other articles of like nature. The cement used preferably should be any ordinary "rubber" cement vulcanizable at room temperature and includes those made from rubber, synthetic rubber, latex, and the like. These cements are well known in the rubber art. Although less satisfactory, it is also possible in some instances to use non-rubber cements of various types known in the footwear industry but since such cements are not vulcanizable they give less satisfactory bonds especially with vulcanized rubber.

The "rubber" employed in the invention may be either natural or synthetic rubber or similar material requiring a heat treatment to effect cure. In some instances the rubber portions may include fabric or other reinforcements as in the case of rubberized fabric.

Having described my invention as related to a typical application of the same, it is my intention that the invention be not limited by this nor by any particular materials of construction, cements or the like, but rather construed broadly within the spirit and scope of the invention as set out in the following claims.

I claim:

1. A method of making a boot or other article of footwear which comprises forming from material subject to injury by hot-vulcanization temperatures a sock-like lining substantially encompassing the foot including the sole thereof, separately forming a shell comprising unvulcanized but vulcanizable rubber and including a sole and one or more elements constituting an upper extending well up on the foot, hot-vulcanizing the rubber shell as a unit while it is still separate from the sock-like lining, thereafter inserting the foot of the lining within the shell as a sock in a shoe, and adhering the lining and the shell together in both the sole region and the upper region.

2. A method of making a boot or other article of footwear which comprises forming from leather material subject to injury by hot-vulcanization temperatures a sock-like lining substantially encompassing the foot including the sole thereof and extending above the angle, separately forming a shell comprising unvulcanized but vulcanizable rubber and including a sole and one or more elements constituting an upper extending well up on the foot, hot-vulcanizing the rubber shell as a unit while it is still separate from the sock-like lining, thereafter inserting the foot of the lining within the shell as a sock in a shoe, and adhering the lining and the shell together in both the sole region and the upper region.

3. A method of making a fleece-lined boot or other article of footwear which comprises forming from fleecy leather material subject to injury by hot-vulcanization temperatures a sock-like lining substantially encompassing the foot including the sole thereof and extending above the angle, separately forming a shell comprising unvulcanized but vulcanizable rubber and including a sole and one or more elements constituting an upper extending well up on the foot, hot-vulcanizing the rubber shell as unit while it is still separate from the sock-like lining, thereafter inserting the foot of the lining within the shell as a sock in a shoe, and adhering the lining and the shell together substantially throughout their contacting surfaces with a rubber adhesive.

4. A method of making a fleece-lined boot or other article of footwear which comprises forming from fleecy leather material subject to injury by hot-vulcanization temperatures a sock-like lining substantially encompassing the foot including the sole thereof and the leg to a point above the ankle, separately forming a slipper-like shell comprising unvulcanized but vulcanizable rubber and including an outsole and upper extending well up on the foot but terminating below the ankle, hot-vulcanizing the rubber shell as a unit while it is still separate from the sock-like lining, thereafter inserting the foot of the lining within the shell as a sock in a shoe, and adhering the lining and the shell together substantially throughout their contacting surfaces with a rubber adhesive vulcanizable substantially at room temperatures.

5. A method of making a boot or other article of footwear which comprises forming from material subject to injury by hot-vulcanization temperatures a sock-like lining substantially encoming the foot including the sole thereof, separately forming a shell comprising unvulcanized but vulcanizable rubber and including a sole and one or more elements constituting an upper extending well up on the foot, hot-vulcanizing the rubber shell as a unit while it is still separate from the sock-like lining, mounting the sock-like lining on a last, positioning the previously vulcanized rubber shell over the foot of the sock after precoating substantially all the contacting sole and upper surfaces of at least one of them with a rubber adhesive vulcanizable substantially at room temperatures, pressing the lining and the shell into adhesive engagement and permitting the adhesive to vulcanize without further heating of the boot.

FREDERICK F. OLSON.